US012613025B1

(12) United States Patent
Xu et al.

(10) Patent No.: US 12,613,025 B1
(45) Date of Patent: Apr. 28, 2026

(54) LED LAMP

(71) Applicant: SHENZHEN SNC OPTO ELECTRONIC CO., LTD, Shenzhen (CN)

(72) Inventors: Jianyong Xu, Shenzhen (CN); Zhiping Ma, Shenzhen (CN)

(73) Assignee: SHENZHEN SNC OPTO ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 19/007,496

(22) Filed: Jan. 1, 2025

(30) Foreign Application Priority Data

Oct. 29, 2024 (CN) .......................... 202422609245.6

(51) Int. Cl.
*F21V 21/30* (2006.01)
*F21Y 115/10* (2016.01)

(52) U.S. Cl.
CPC ........... *F21V 21/30* (2013.01); *F21Y 2115/10* (2016.08)

(58) Field of Classification Search
CPC .......... F21V 21/30; F21V 21/14; F21V 21/00; F21V 19/00; F21V 19/003; F21V 19/0035; F21V 17/00; F21V 17/02; F21V 17/10; F21V 17/104; F21Y 2115/10
See application file for complete search history.

(56) References Cited

U.S. PATENT DOCUMENTS

| | | | | |
|---|---|---|---|---|
| 10,718,500 | B1 * | 7/2020 | Tylicki | F21V 21/30 |
| 12,117,143 | B1 * | 10/2024 | Xu | F21V 21/30 |
| 12,127,318 | B1 * | 10/2024 | Xu | F21V 31/005 |
| 2022/0252244 | A1 * | 8/2022 | Erdener | F21V 23/007 |

* cited by examiner

*Primary Examiner* — Bao Q Truong
(74) *Attorney, Agent, or Firm* — Hemisphere Law, PLLC

(57) ABSTRACT

The present disclosure provides a LED lamp related to the field of illumination devices, the LED lamp including a body, a base installed on the body, and a bracket assembly with one end connecting to the base and the other end connecting to the outside. The bracket assembly includes an installing member and a connecting block connected with each other, and an angle that the connecting block relative to the installing member can be adjusted. The connecting block includes a seat and a mounting portion connected to the seat. The base has an installation groove, and the mounting portion has a protrusion adapted to the installation groove. The present disclosure can reduce a development cycle and a cost of the LED lamp, and adjust a light output angle of the LED lamp during installation of the LED lamp.

10 Claims, 9 Drawing Sheets

LED LAMP

CROSS-REFERENCE TO RELATED APPLICATION

This application claims the benefit of priority from Chinese Patent Application No. 202422609245.6 entitled "LED LAMP" and filed on Oct. 29, 2024, the content of which is hereby incorporated by reference in its entire by reference.

BACKGROUND

Technical Field

The present disclosure generally relates to the field of illumination devices, and especially relates to an LED lamp.

Description of Related Art

Outdoor lamps need to be installed on vertical walls, horizontally extending lamp posts, or flat surfaces etc. The lamps on the market are usually integrated structures, that is, a housing of the lamp has corresponding installation positions. During installing the lamp, an installation position of the lamp is fixed at a location to be installed, because the installation positions of the lamp are vary, the housing of the lamp needs to be modified according to an installation site, which needs redesigning and re-molding the housing of the lamp, thereby increasing a development cycle and a cost of the lamp. Furthermore, this kind of lamp is inconvenient to be installed, and this kind of lamp on the market can't adjust an illumination angle during installation, so that after the development of the lamp is completed, a light output angle of the lamp is already fixed, rather than being adjusted any more.

SUMMARY

The technical problems to be solved: in view of the shortcomings of the related art, the present disclosure provides an LED lamp which can reduce a development cycle and costs of matching lighting fixtures with different locations, facilitate to be installed, and adjust a light output angle of the LED lamp during installation thereof.

In order to solve the above objectives, an LED lamp according to an embodiment of the present disclosure includes:

- a body;
- a base installed on the body;
- a bracket assembly with one end connecting to the base and the other end connecting to the outside; and wherein
- the bracket assembly includes an installing member and a connecting block connected with each other, wherein the connecting block can rotate relative to the installing member so that an angle between the connecting block and the installing member can be adjusted; and wherein the connecting block is fixed to the base and includes a seat and a mounting portion connected to the seat, wherein the base and the mounting portion respectively have compatible installation grooves and protrusions, the protrusions received in the installation grooves.

Wherein the base includes a first chamber, the connecting block comprises a second chamber, and the installing member has a third chamber, all the first chamber, the second chamber and the third chamber connected to the body.

Wherein the seat is a cylindrical structure and includes a plurality of first teeth gathered around in a circle, and the installing member includes a plurality of second teeth matched with the plurality of first teeth, wherein the seat rotates relative to the installing member so that the plurality of first teeth engaged with the plurality of second teeth at different angles, to adjust the angle between the installing member and the connecting block.

Wherein the bracket assembly further includes an angle plate installed on the seat, wherein the angle plate has an angle ruler thereof.

Wherein the installing member includes an installing hole formed at one end away from the connecting block and configured for inserting an external installation rod therein.

Wherein the installing member further includes a cylindrical groove for receiving the seat, the second tooth arranged on a bottom wall of the cylindrical groove.

Wherein a notch is formed on a sidewall of the cylindrical groove and configured to control an angle that is relatively rotated between the connecting block and the installing member.

Wherein the installing member defines an installing wall formed at one end of the installing member away from the connection block, the installing wall configured to connect to the outside rod.

Wherein the body includes a heat sink, an LED light plate, a lens plate and a power supply, the power supply electrically connected to the LED light plate, the LED light plate mounted on the heat sink, and the lens plate mounted on the heat sink and covered on the LED light plate.

Wherein the body further includes a frame arranged on the lens plate, one end of the frame rotatably connected to the heat sink, and the other end of the frame clamped onto the heat sink.

An LED lamp according to another embodiment of the present disclosure includes:

- a body;
- a base installed on the body;
- a bracket assembly installed on the base; and wherein
- the bracket assembly includes a connecting block, a first rotating frame fixedly installed on the connecting block, and a second rotating frame rotatable relative to the first rotating frame to adjust an angle therebetween; and wherein the base and the connecting block respectively have compatible installation grooves and protrusions, the protrusions received in the installation grooves.

Wherein both the first rotating frame and the second rotating frame are U-shaped structures, and the first rotating frame and the second rotating frame arranged opposite to each other, wherein the angle between the first rotating frame and the second rotating frame can be adjusted.

Wherein the first rotating frame includes a first horizontal wall and two first vertical walls arranged in parallel intervals, both ends of the first horizontal wall connected to the two first vertical walls respectively, and the second rotating frame includes a second horizontal wall and two second vertical walls arranged in parallel intervals, both ends of the second horizontal wall connected to the two first vertical walls respectively, each of the two first vertical walls defining a central axis and at least one post spaced apart from the central axis. each of the two second vertical walls defining a central hole and a plurality of positioning holes arranged around the central hole, the central axis inserted into the central hole, wherein the angle between the first rotating frame and the second rotating frame can be adjusted by adjusting a position of the at least one post within a corresponding positioning hole.

Wherein the at least one post includes one post, the number of the plurality of positioning holes is multiple, wherein an angle between two adjacent positioning holes is within a range of 5-35 degrees.

Wherein the at least one post includes two posts respectively arranged on the same side of the two first vertical walls.

Wherein the base includes a first chamber, and the connecting block includes a second chamber, the first horizontal wall of the first rotating frame defining a wiring hole, wherein all the body, the first chamber, the second chamber and the wiring hole are connected with each other.

Wherein the connecting block includes a mounting board fixedly connected to the first horizontal wall, and a connecting wall, the protrusions arranged on opposite sides of the connecting wall.

An LED lamp according to another embodiment of the present disclosure includes:

a body;

a base installed on the body;

a bracket assembly with one end connecting to the base and the other end connecting to the outside; and wherein the base has an installation groove, and the bracket assembly has a protrusion adapted to the installation groove.

Wherein the base includes a flat plate located near the body, an installing portion connected to the flat plate, the installation groove arranged on the installing portion, and the bracket assembly comprising a housing and a bottom plate connected to the housing, the protrusion set on the housing, and the bottom plate configured to fix the LED lamp to the outside.

Wherein the flat plate includes a first hole connected to the installation groove, the housing defining a fourth chamber connected to the installation groove, and the bottom plate defining a second hole connected to the fourth chamber.

The present disclosure provides the advantages as below: the present disclosure provides the LED lamp with a separated structure to match different places so that it can reduce the development cycle and costs of the LED lamp, and facilitate to be installed.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
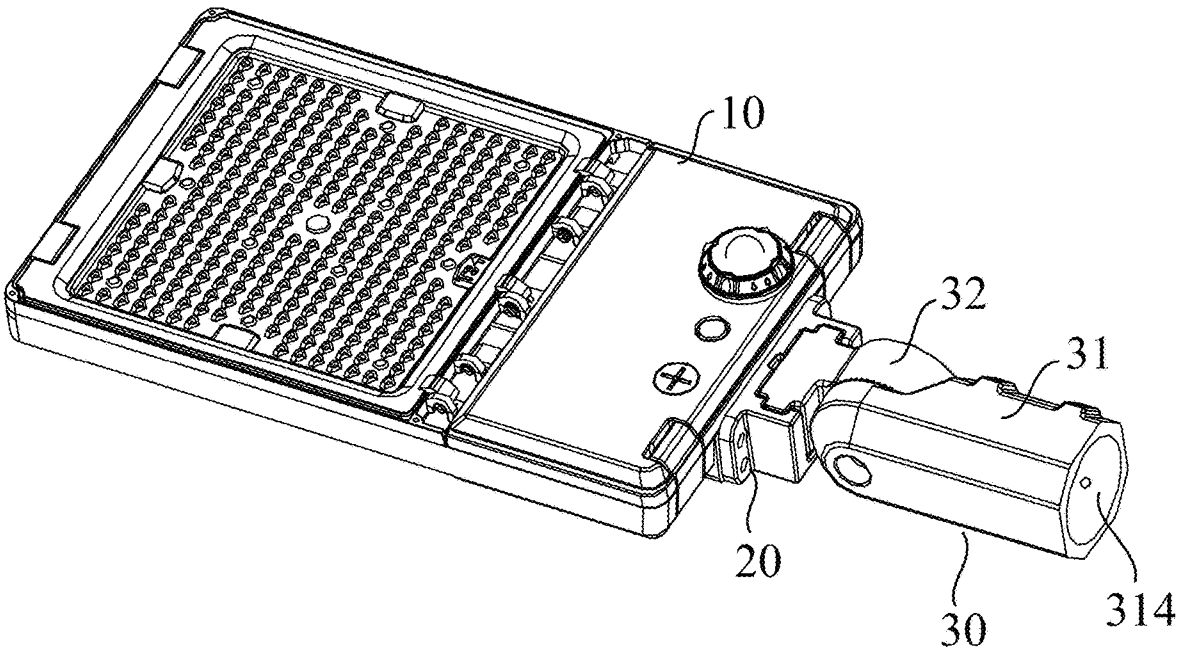
FIG. 1 is a schematic view of an LED lamp in accordance with a first embodiment of the present disclosure.
Figure 2:
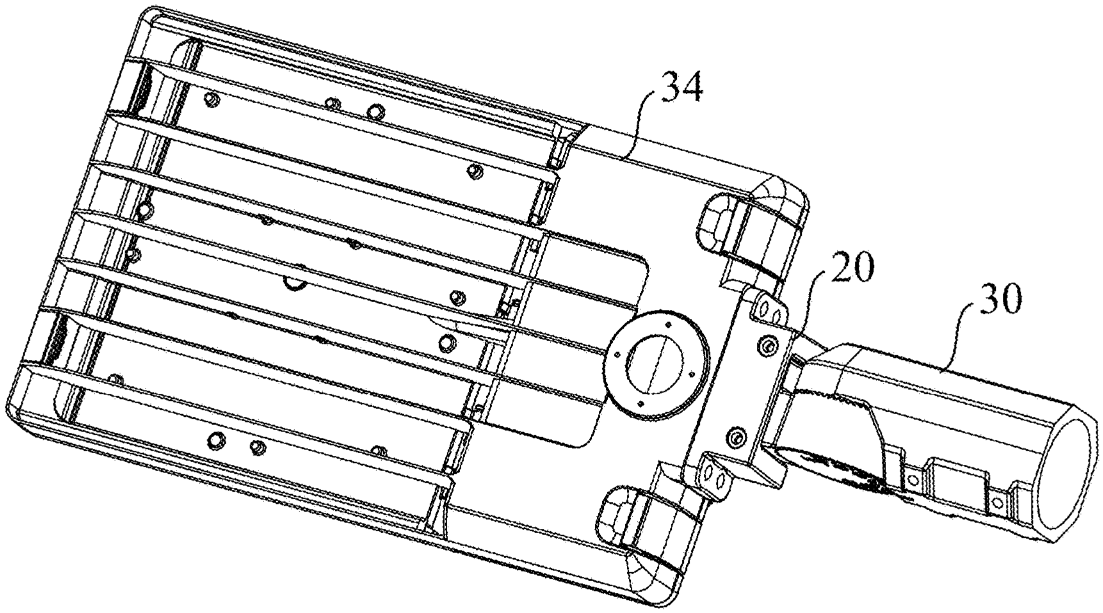
FIG. 2 is similar to FIG. 1, but shown from another view.
Figure 3:
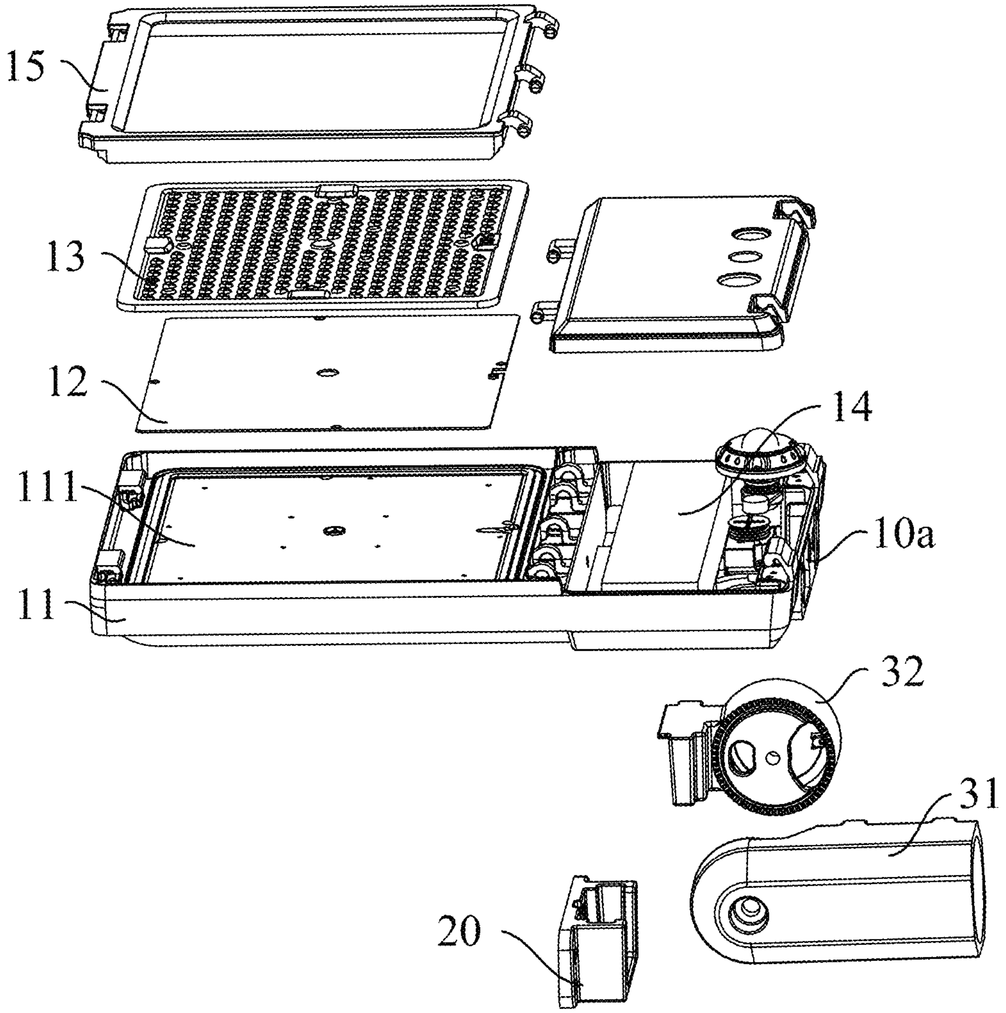
FIG. 3 is an exploded, schematic view of the LED lamp of FIG. 1.
Figure 4:
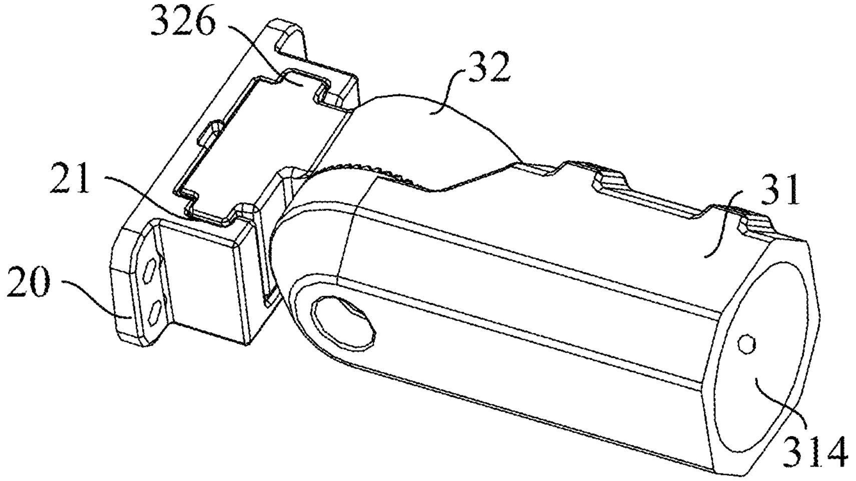
FIG. 4 is a partial schematic view of a part of the LED lamp of FIG. 1.
Figure 5:
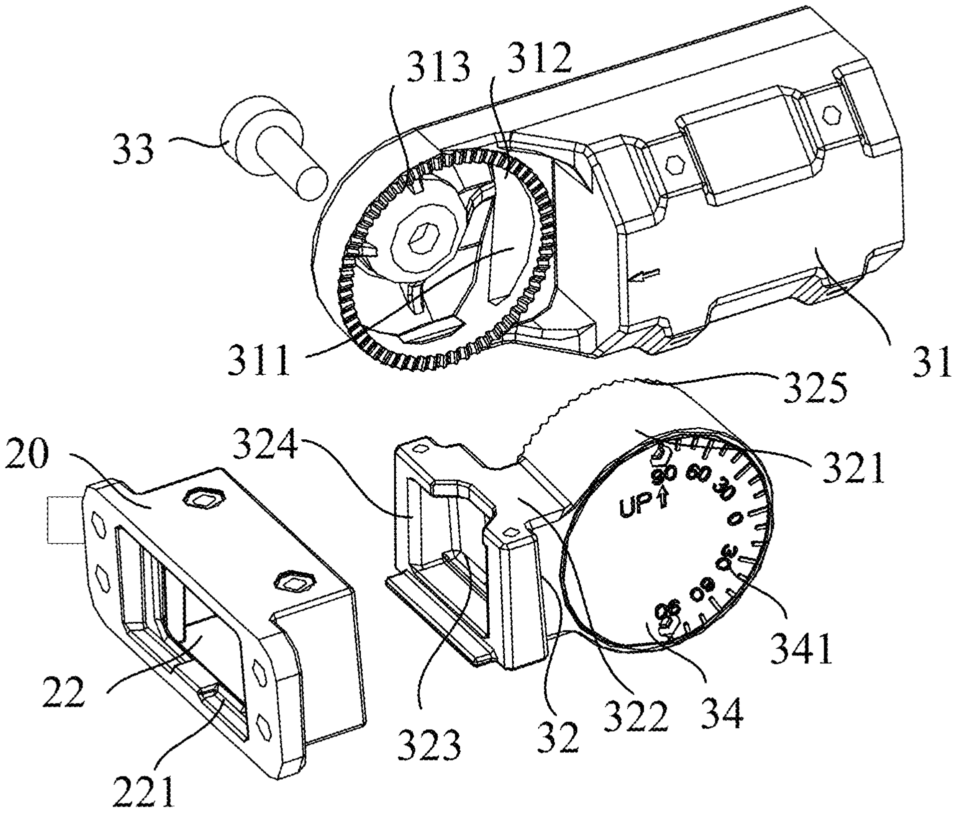
FIG. 5 is an exploded, schematic view of FIG. 4.

The element labels according to the embodiment of the present disclosure shown as below:

10 body, 10*a* first opening, 11 heat sink, 111 receiving room, 12 LED light plate, 13 lens plate, 14 external power supply, 15 frame, 20 base, 21 installation groove, 22 first chamber, 221 second opening, 23 flat plate, 231 first hole, 24 installing portion, 30 bracket assembly, 31 installing member, 311 third chamber, 312 fourth opening, 313 second tooth, 314 installing hole, 315 installing wall, 316 cylindrical groove, 3161 bottom wall, 3162 sidewall, 3163 notch, 32 connecting block, 321 seat, 322 mounting portion, 323 second chamber, 324 third opening, 325 first tooth, 326 protrusion, 327 mounting board, 328 connecting wall, 33 fixing member, 34 angle plate, 341 angle ruler, 35 first rotating frame, 351 first horizontal wall, 352 first vertical wall, 353 central axis, 354 post, 355 wiring hole, 36 second rotating frame, 361 second horizontal wall, 362 second vertical wall, 363 central hole, 364 positioning hole, 37 housing, 371 fourth chamber, 38 bottom plate, 381 second hole.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be noted that if terms such as directional indications of "up", "down", "left", "right", "front" and "back", etc. are involved in the embodiments of the present disclosure, the directional indications are only used to explain a relative position relationship and a motion condition etc between components in a specific posture. If the specific posture changes, the directional indications will also change accordingly. The terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

In addition, the terms such as "first" and "second" shown in the specification are only used to describe, but not indicated that the elements of the present disclosure is important or represented the amount of the elements. That is, the features limited by the terms of "first" and "second" may explicitly or implicitly include one or more features. It should also be further understood that the term "and/or" used in the description of the present disclosure refers to include three parallel schemes that it is taken "A and/or B" as an example, which includes an A scheme, or a B scheme, or both A and B schemes. In addition, technical solutions among various embodiments can be combined with each other, but it should be implemented for one of ordinary skill in the related art. When the combination of technical solutions is contradictory or impossible to be implemented, it should be considered that such combination of technical solutions does not exist and is not within the protection scope of the present disclosure.

Referring to FIGS. 1-5, an LED lamp according to an embodiment of the present disclosure includes a body 10, a base 20 and a bracket assembly 30. The base 20 is installed on the body 10, and one end of the bracket assembly 30 is connected to the base 20 and the other end of the bracket assembly 30 is connected to the outside. The outside here refers to a position where the LED lamp is installed, such as a utility pole, a wall, or a horizontal surface etc. The bracket assembly 30 is configured to connect the base 20 to the external installation position. The bracket assembly 30 includes an installing member 31 and a connecting block 32, the connecting block 32 rotatable relative to the installing member 31 so that an angle between the connecting block 32 and the installing member 31 can be adjusted. The connecting block 32 includes a seat 321 and a mounting portion 322 connected to the seat 321. The base 20 and the mounting portion 322 respectively have compatible installation grooves 21 and protrusions 326, the protrusions 326 received in the installation grooves 21.

In an embodiment of the present disclosure, the base 20 has the installation groove 21, and the protrusion 326 is provided on the mounting portion 322. A size of the protrusion 326 is adapted to that of the installation groove 21. The protrusion 326 is installed in the installation groove 21 to conveniently position the connecting block 32 and the base 20.

When assembling the LED lamp of the present disclosure, first fixing the base 20 on a side of the body 10, and a specific fixing method can be fixed by screws. Subsequently, fixing the installing member 31 of the bracket assembly 30 in a position that needs to be fixed, such as a lamp post, a wall etc. And then, placing the protrusion 326 of the connecting block 32 into the installation groove 21 of the base 20, and fixing the base 20 and the connecting block 32 with screws. When the base 20 and connecting block 32 are not completely fixed with each other, the connecting block 32 and the installing member 31 can rotate relative to each other so that the angle between the connecting block 32 and the installing member 31 can be adjusted according to actual needs to ensure that an illumination angle of the LED lamp is in a preset direction.

The LED lamp of the present disclosure is provided to fix the body 10 in a required installation position by installing the bracket assembly 30 and the base 20. The body 10 is a constant module, and users can replace different bracket assemblies 30 according to different installation positions, thereby reducing a cycle and a cost of redeveloping the LED lamp. An installation angle of the present disclosure can be adjusted appropriately to obtain different illumination angles. Users can set and install according to their own needs. Furthermore, the bracket assembly 30 of the LED lamp is separated from the body 10, so that an overall weight of the LED lamp can be reduced and labor burden for installing the LED lamp can be also reduced.

In an optional embodiment of the present disclosure, the base 20 includes a first chamber 22, the connecting block 32 includes a second chamber 323, and the installing member 31 has a third chamber 311, all the first chamber 22, the second chamber 323 and the third chamber 311 connected to the body 10.

Specifically, the body 10 and the bracket assembly 30 are separately arranged, so it is necessary to design wires between the body 10 and the bracket assembly 30 to ensure that the wires of the body 10 can pass through the bracket assembly 30 and connect to an external power supply 14.

The body 10 has a first opening 10*a* formed at a position corresponding to the base 20, and the base 20 has the first chamber 22. A second opening 221 is provided at a position of the first chamber 22 corresponding to the first opening 10*a* of the body 10. The connecting block 32 is installed on the base 20 and has the second chamber 323 connected to the first chamber 22 through a third opening 324. The installing member 31 is connected to the connecting block 32 and has a third chamber 311 connected to the second chamber 323 through a fourth opening 312. The wires of the body 10 pass through the first opening 10*a*, the second opening 221, the first chamber 22, the third opening 324, the second chamber 323, the fourth opening 312 and the third chamber 311 in sequence, and finally are sent out from the third chamber 311 to connect to the external power supply 14.

In an optional embodiment of the present disclosure, the seat 321 of the connecting block 32 is a cylindrical structure and includes a circle of first teeth 325, and the installing member 31 includes a circle of second teeth 313 matched with the circle of first teeth 325. The first tooth 325 and the second tooth 313 are coaxially arranged, and the first tooth 325 and the second tooth 313 can rotate relative to each other so that first tooth 325 and the second tooth 313 can mesh with different their respective parts to adjust the angle between the installing member 31 and the connecting block 32.

Specifically, the seat 321 is cylindrical structure, and the circle of first teeth 325 is arranged on a side of the seat 321 facing the installing member 31. The circle of first teeth 325 is evenly arranged around an axis of the seat 321, and located on an outer periphery of the side of the seat 321 that faces the installing member 31. The circle of second teeth 313 is arranged at a position of the seat 321 corresponding to the installing member 31, which is arranged opposite to the circle of first teeth 325 on the same axis and mesh with the circle of first teeth 325. The fixing member 33 passes through the installing member 31 and the seat 321 of the connecting block 32 to fix the installing member 31 and the connecting block 32. The fixing member 33 is a bolt that passes through a center of the first teeth 325 and the second teeth 313. When assembling the installing member 31 and the connecting block 32, first threading the bolts through the installing member 31 and the connecting block 32, to perform pre-positioning (that is unlock the installing member 31 and the connecting block 32 first), at this point, there is a distance between the first tooth 325 and the second tooth 313, so that the installing member 31 and the connecting block 32 can rotate relative to each other. In this way, the angle between the installing member 31 and the connecting block 32 can be adjusted according to actual installation needs. That is, rotating the seat 321 or the installing member 31 so that the first tooth 325 on the seat 321 and the second tooth 313 on the installing member 31 can rotate with each other to adjust the angle between the seat 321 and the installing member 31; and then tightening the bolt so that the first tooth 325 and the second tooth 313 mesh with each other, at this time, the angle between the seat 321 and the installing member 31 is fixed, that is, the angle between the installing member 31 and the connecting block 32 is fixed.

Since the connecting block 32 is also fixed on the base 20 of the body 10, the angle between the body 10 and the installing member 31 is also fixed.

The bracket assembly 30 further includes an angle plate 34 installed on the seat 321, wherein the angle plate 34 has an angle ruler 341 thereof. The angle plate 34 is exposed to the outside for users to observe the angle that is adjusted from the outside. The angle ruler 341 is installed on the angle plate 34, when both the installing member 31 and the connecting block 32 are in a straight line, zero degree is displayed on the angle ruler 341. As shown in the figure, a middle position of the angle ruler 341 is a zero degree position, and then it increases clockwise and counterclockwise from the middle to 90 degrees. An accuracy of the angle ruler 341 is 10 degrees. When adjusting the installing member 31 and the connecting block 32, users can directly adjust the angle between the installing member 31 and the connecting block 32 to a desired angle from the angle ruler 341.

In an optional embodiment of the present disclosure, the installing member 31 includes an installing hole 314 formed at one end away from the connecting block 32 and configured for inserting an external installation rod therein. Specifically, in an embodiment of the present disclosure, the installing member 31 is installed on a cylindrical mounting rod, and the installing hole 314 is provided on the installing member 31 for inserting the mounting rod. After completely installation, the installing member 31 is fixed to the mounting rod by screws.

Figure 6:
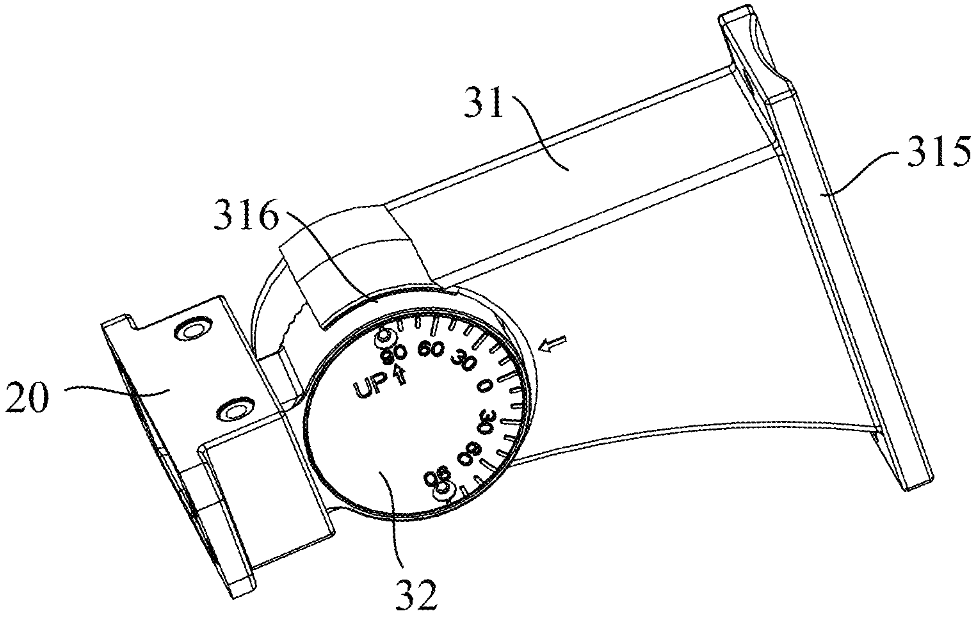
FIG. 6 is a partial schematic view of a part of an LED lamp in accordance with a second embodiment of the present disclosure.
Figure 7:
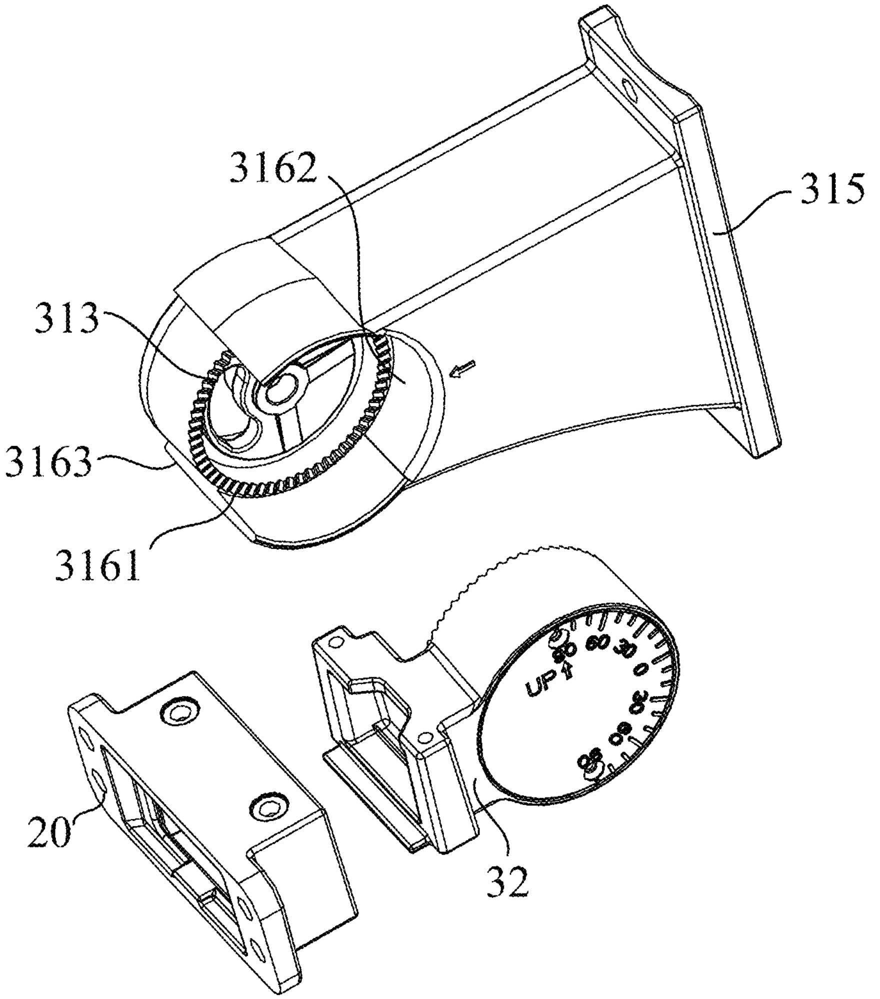
FIG. 7 is an exploded, schematic view of FIG. 6.

Referring to FIG. 6 and FIG. 7, in an optional embodiment of the present disclosure, the installing member 31 31 is fixed and installed on a flat surface. An installing wall 315 is arranged on an end of the installing member 31 away from the connecting block 32, and configured to connect to an outer flat structure such as a wall, which can be a horizontal plane or a vertical plane. The installing wall 315 is integrated with the installing member 31, and a plurality of screw holes are provided on the installing wall 315 to fix the installing member 31 on the plane to be installed by threading the screws through the installing wall 315.

The installing member 31 further includes a cylindrical groove 316 for receiving the seat 321, the second tooth 313 arranged on a bottom wall 3161 of the cylindrical groove 316. A notch 3163 is formed on a sidewall 3162 of the cylindrical groove 316 and configured to control the angle that is relatively rotated between the connecting block 32 and the installing member 31.

Specifically, in an embodiment of the present disclosure, the cylindrical groove 316 is formed on the installing member 31, the circle of second teeth 313 is arranged on the bottom wall 3161 of the cylindrical groove 316, and the seat 321 is received in the cylindrical groove 316. When assembling the installing member 31 and the connecting block 32, first aligning the seat 321 of the connecting block 32 with the cylindrical groove 316, and then gradually approaching the seat 321 to the cylindrical groove 316. The cylindrical groove 316 plays a guiding role, so that it is convenient for operators to assemble the installing member 31 and the connecting block 32. After the second tooth 313 and the first tooth 325 mesh with each other and are adjusted to a predetermined angle, the installing member 31 and the connecting block 32 are completely fixed with each other by passing bolts through the installing member 31 and the connecting block 32. In an embodiment of the present disclosure, the notch 3163 is arranged on the sidewall 3162 of the cylindrical groove 316, so as to provide a space for a rotation of the connecting block 32. An angle of the notch

3163 is the angle range of mutual rotation between the installing member 31 and the connecting block 32.

In some optional embodiments of the present disclosure, the body 10 includes a heat sink 11, an LED light plate 12, a lens plate 13 and an external power supply 14, the external power supply 14 electrically connected to the LED light plate 12 to control the LED light plate 12 to be turned on and turned off. The heat sink 11 includes a receiving room 111 for receiving the LED light plate 12 therein. The lens plate 13 is mounted on the heat sink 11 and covered on the LED light plate 12, to prevent light emitted by the body 10 from dazzling, thereby improving softness of the light emitted by the body 10, and create a comfortable lighting environment thereof.

In some optional embodiments of the present disclosure, the body 10 further includes a frame 15 arranged on the lens plate 13, one end of the frame 15 rotatably connected to the heat sink 11, and the other end of the frame 15 clamped onto the heat sink 11.

Specifically, the body 10 also includes the frame 15 arranged outside the lens plate 13 and configured to fix a lens on the heat sink 11. The frame 15 is a rectangular-ambulatory-plane structure, with at least one rotating shaft being formed at one end along a length direction thereof and a slot at the other end thereof. The heat sink 11 has at least one rotation hole at a position corresponding to the at least one rotating shaft, and the at least one rotating shaft is set inside the at least one rotation hole. The heat sink 11 is also equipped with a buckle structure that is compatible with the slot, and the buckle structure is fastened into the slot to fix the frame 15 on the heat sink 11. The present disclosure is convenient for assembly and disassembly during later maintenance. It can be understood that the body 10 also includes a control knob connected to the external power supply 14 to control light output of the LED lamp.

Figure 8:
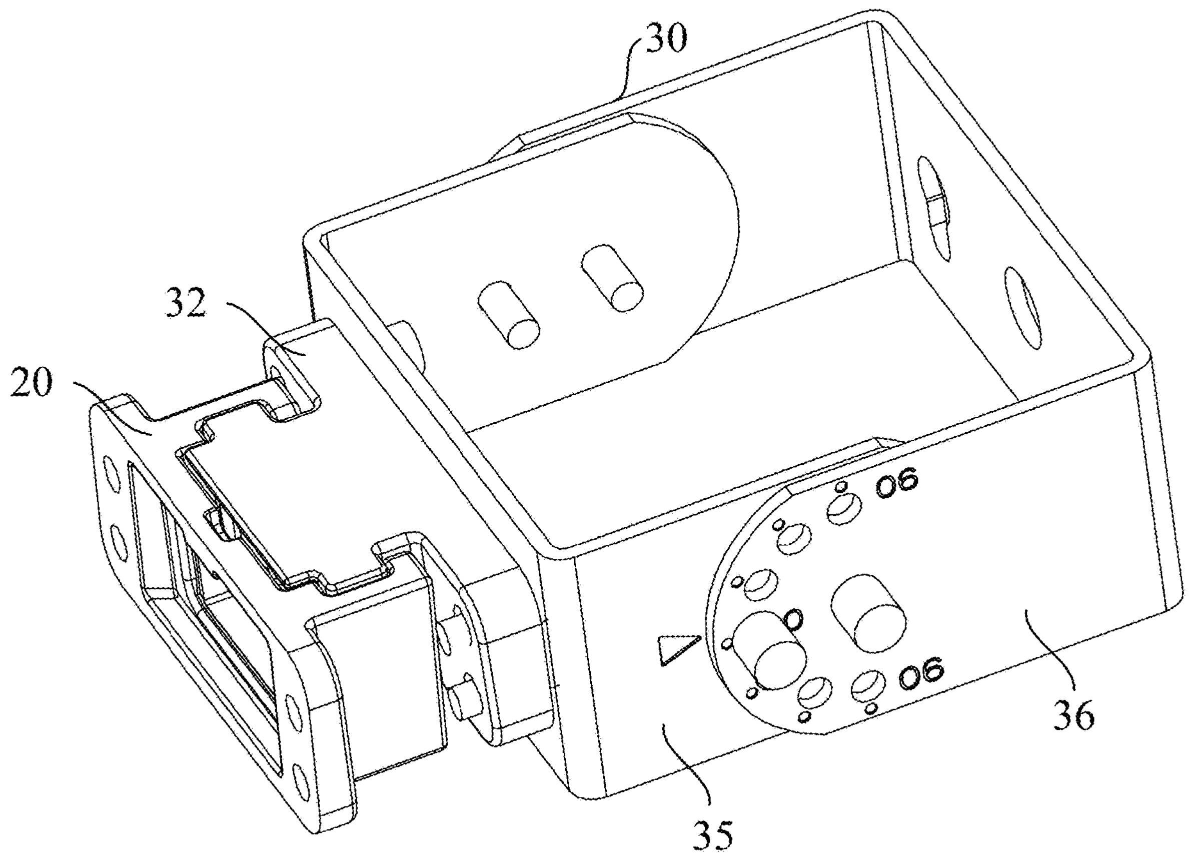
FIG. 8 is a partial schematic view of a part of an LED lamp in accordance with a third embodiment of the present disclosure.
Figure 9:
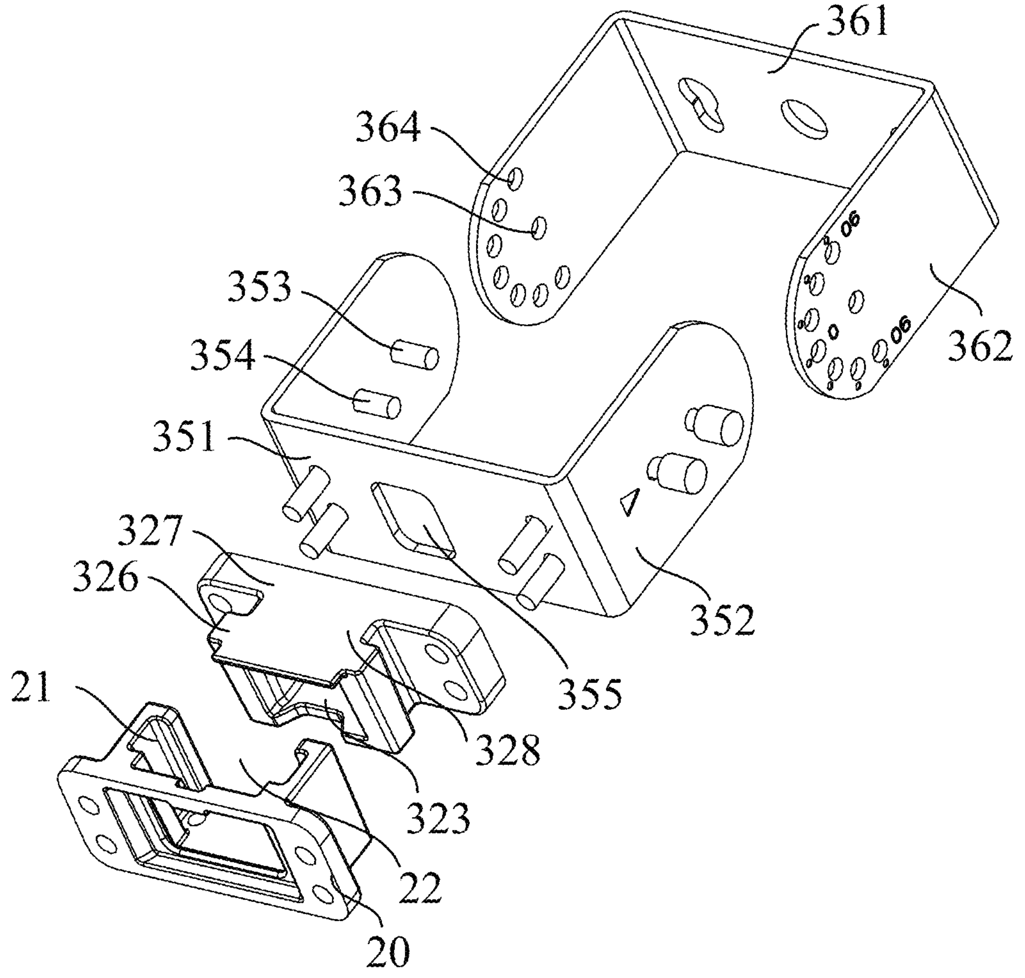
FIG. 9 is an exploded, schematic view of FIG. 8.

Referring to FIG. 8 and FIG. 9, an LED lamp according to another embodiment of the present disclosure includes a body 10, a base 20 and a bracket assembly 30. The base 20 is installed on the body 10, and the bracket assembly 30 is installed on the base 20 and configured to connect the base 20 to an outer installation position.

The bracket assembly 30 includes a connecting block 32, a first rotating frame 35 fixedly installed on the connecting block 32, and a second rotating frame 36 rotatable relative to the first rotating frame 35 to adjust an angle therebetween; and wherein the base 20 has an installation groove 21, and the connecting block 32 has a protrusion 326 matched with the installation groove 21.

Specifically, in the LED lamp of the present disclosure, the base 20 and the connecting block 32 are provided between the bracket assembly 30 and the body 10. When assembling, first installing the connecting block 32 on the bracket assembly 30, and installing the bracket assembly 30 on a position that needs to be installed, and then, aligning the protrusion 326 of the connecting block 32 with the installation groove 21 of the base 20 to install the connecting block 32 on the base 20, finally, fixing the base 20 and the connecting block 32 through bolts.

The bracket assembly 30 includes the connecting block 32, the first rotating frame 35 and the second rotating frame 36 that can rotate relative to each other to adjust the angle between the first rotating frame 35 and the second rotating frame 36. The connecting block 32 is fixedly installed on the first rotating frame 35, and the second rotating frame 36 is configured to fix on the outer installation position. The angle between the first rotating frame 35 and the second rotating frame 36 can be adjusted, and after adjustment the angle, the first rotating frame 35 and the second rotating frame 36 can be completely fixed with each ither by fixing the fixing member 33.

Both the first rotating frame 35 and the second rotating frame 36 are U-shaped structures. The first rotating frame 35 includes a first horizontal wall 351 and two first vertical walls 352 arranged in parallel intervals, the two first vertical walls 352 respectively connected to two ends of the first horizontal wall 351 and perpendicular to the first horizontal wall 351. The second rotating frame 36 includes a second horizontal wall 361, and two second vertical walls 362 arranged in parallel intervals and respectively connected to two ends of the second horizontal wall 361. Each of the two first vertical walls 352 defines a central axis 353 and at least one post 354. Each of the two second vertical walls 362 defines a central hole 363 and a plurality of positioning holes 364 evenly arranged around the central hole 363, wherein a distance between the central hole 363 and each of the plurality of positioning holes 364 is the same as a distance between the central axis 353 and the post 354, so that when the central axis 353 is inserted into the central hole 363, the post 354 can be inserted into one of the plurality of positioning holes 364.

In an optional embodiment of the present disclosure, the number of the at least one post 354 is set to one, the number of positioning holes 364 is set to multiple, and the positioning holes 364 are evenly arranged around the central hole 363, wherein an angle between two adjacent positioning holes is within a range of 5-35 degrees. The present disclosure sets the number of post 354 to one, when assembling the second vertical wall 362 and the first vertical wall 352, only one post 354 is need to be aligned with the central axis 353. Only one post 354 is provided to be sufficient to position the second vertical wall 362 and the first vertical wall 352. During assembly, the first rotating frame 35 and the second rotating frame 36 are arranged opposite to each other, and the two first vertical walls 352 of the first rotating frame 35 are assembled with the two second vertical walls 362 of the second rotating frame 36 in an one-to-one correspondence. When the central axis 353 the two first vertical walls 352 and the post 354 are correspondingly inserted into the central hole 363 and the positioning hole 364 of the two second vertical walls 362, the second vertical wall 362 and the first vertical wall 352 can be locked with each other by the fixing member 33. It can be understood that an angle between two adjacent positioning holes 364 is the accuracy of rotation adjustment between the first rotating frame 35 and the second rotating frame 36. When assembling, the post 354 is inserted into different positioning holes 364 to adjust the angle between the first rotating frame 35 and the second rotating frame 36.

In an optional embodiment of the present disclosure, two posts 354 are arranged on the same side of the two first vertical walls 352. Specifically, as shown in FIG. 9, the post 354 arranged on one of the two first vertical walls 352 is set on a right side of the one first vertical wall 352, and the post 354 arranged on the other first vertical wall 352 is also set on the right side of the other first vertical wall 352. Setting the post 354 on the same side of the corresponding first vertical wall 352 can conveniently assembly the first rotating frame 35 and the second rotating frame 36. In the embodiment shown in FIG. 9, during assembly, the first vertical wall 352 on the right side is first moved between the two second vertical walls 362, and then the entire first rotating frame 35 is moved to the right side to insert the central axis 353 and the post 354 of the two first vertical walls 352 into the central hole 363 and the positioning hole 364 of the two second vertical walls 362, respectively, thereby obtaining a more convenient assembly.

In an embodiment of the present disclosure, the base 20 includes a first chamber 22, and the connecting block 32 includes a second chamber 323, the first horizontal wall 351 of the first rotating frame 35 defining a wiring hole 355, wherein all the body 10, the first chamber 22, the second chamber 323 and the wiring hole 355 are connected with each other. The wire of the body 10 passes through the heat sink 11 and sequentially passes through the first chamber 22 of the base 20, the second chamber 323 of the connecting block 32 and the wiring hole 355 of the first rotating frame 35 to connect to the external power supply 14.

The connecting block 32 includes a mounting board 327 fixedly connected to the first horizontal wall 351, and a connecting wall 328, the protrusions 326 arranged on opposite sides of the connecting wall 328. In the embodiment, the connecting block 32 is an H-shaped structure, and the mounting board 327 of the connecting block 32 is tightly attached to the first horizontal wall 351 of the first rotating frame 35, and the mounting board 327 of the connecting block 32 can be fixed to the first horizontal wall 351 by screws.

Figure 10:
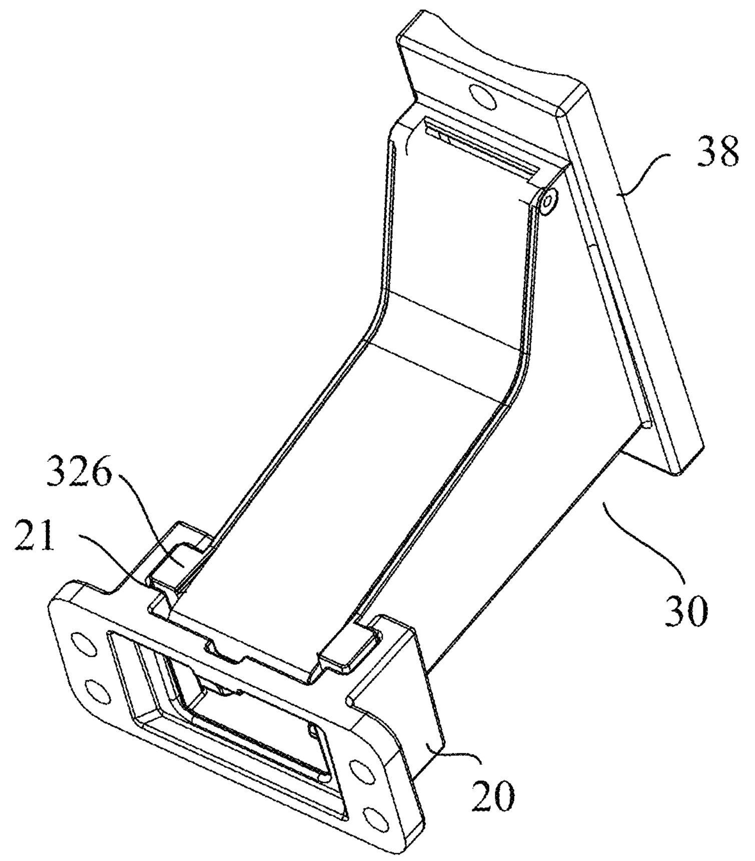
FIG. 10 is a partial schematic view of a part of an LED lamp in accordance with a fourth embodiment of the present disclosure.
Figure 11:
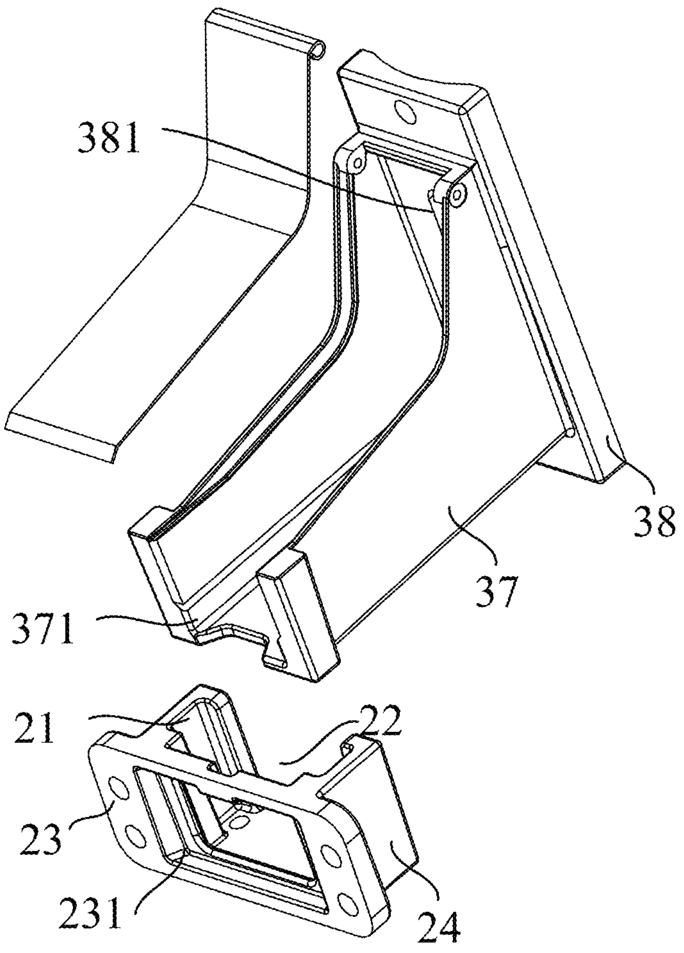
FIG. 11 is an exploded, schematic view of FIG. 10.

Referring to FIG. 10 and FIG. 11, an LED lamp according to another embodiment of the present disclosure includes a body 10, a base 20 and a bracket assembly 30, one end of the bracket assembly 30 connected to the base and the other end of the bracket assembly 30 connected to the outside. The base 20 has an installation groove 21, and the bracket assembly 30 has a protrusion 326 adapted to the installation groove 21. The base 20 is fastened to the body 10 through screws.

The base 20 includes a flat plate 23 located near the body 10, an installing portion 24 connected to the flat plate 23, the installation groove 21 arranged on the installing portion 24. The bracket assembly 30 includes a housing 37 and a bottom plate 38 connected to the housing 37, the protrusion 326 set on the housing 37, and the bottom plate 38 configured to fix the LED lamp to the outside. The protrusion 326 extends outward from two opposite ends of the housing 37 to protrude out of the housing 37. The protrusion 326 is received in the installation groove 21, and there is also a slot formed on a sidewall of the installation groove 21 for placing the housing 37. The slot is adapted to a width of the housing 37 and is smaller than a width of the installation groove 21, so that the housing 37 can directly slide into the installation position along the installation groove 21. After the housing 37 slides into the installation position, the installing portion 24 and the housing 37 can be fixed with each other by bolts passing through the installing portion 24 and the housing 37.

In an embodiment of the present disclosure, the flat plate 23 includes a first hole 231 connected to the installation groove 21, the housing 37 defining a fourth chamber 371 connected to the installation groove 21, and the bottom plate 38 defining a second hole 381 connected to the fourth chamber 371. The wire of the body 10 passes through the heat sink 11, enters the installation slot 21 through the first opening 231, enters the fourth chamber 371, and finally exits the outside through the second opening 381 of the bottom plate 38 to connect to the external power supply 14.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED lamp comprising:

a body;

a base installed on the body;

a bracket assembly with one end connecting to the base and the other end connecting to the outside; and wherein the bracket assembly comprises an installing member and a connecting block connected with each other, wherein the connecting block can rotate relative to the installing member so that an angle between the connecting block and the installing member can be adjusted; and wherein the connecting block is fixed to the base and comprises a seat and a mounting portion connected to the seat, wherein the base and the mounting portion respectively have compatible installation grooves and protrusions, the protrusions received in the installation grooves.

2. The LED lamp as claimed in claim 1, wherein the base comprises a first chamber, the connecting block comprises a second chamber, and the installing member has a third chamber, all the first chamber, the second chamber and the third chamber connected to the body.

3. The LED lamp as claimed in claim 2, wherein the seat is a cylindrical structure and comprises a plurality of first teeth gathered around in a circle, and the installing member comprises a plurality of second teeth matched with the plurality of first teeth, wherein the seat rotates relative to the installing member so that the plurality of first teeth engaged with the plurality of second teeth at different angles, to adjust the angle between the installing member and the connecting block.

4. The LED lamp as claimed in claim 3, wherein the bracket assembly further comprises an angle plate installed on the seat, wherein the angle plate has an angle ruler thereof.

5. The LED lamp as claimed in claim 4, wherein the installing member comprises an installing hole formed at one end away from the connecting block and configured for inserting an external installation rod therein.

6. The LED lamp as claimed in claim 4, wherein the installing member further comprises a cylindrical groove for receiving the seat, the second tooth arranged on a bottom wall of the cylindrical groove.

7. The LED lamp as claimed in claim 6, wherein a notch is formed on a sidewall of the cylindrical groove and configured to control an angle that is relatively rotated between the connecting block and the installing member.

8. The LED lamp as claimed in claim 7, wherein the installing member defines an installing wall formed at one end of the installing member away from the connection block, the installing wall configured to connect to the outside rod.

9. The LED lamp as claimed in claim 1, wherein the body comprises a heat sink, an LED light plate, a lens plate and a power supply, the power supply electrically connected to the LED light plate, the LED light plate mounted on the heat sink, and the lens plate mounted on the heat sink and covered on the LED light plate.

10. The LED lamp as claimed in claim 9, wherein the body further comprises a frame arranged on the lens plate, one end of the frame rotatably connected to the heat sink, and the other end of the frame clamped onto the heat sink.

* * * * *